Figure 1:
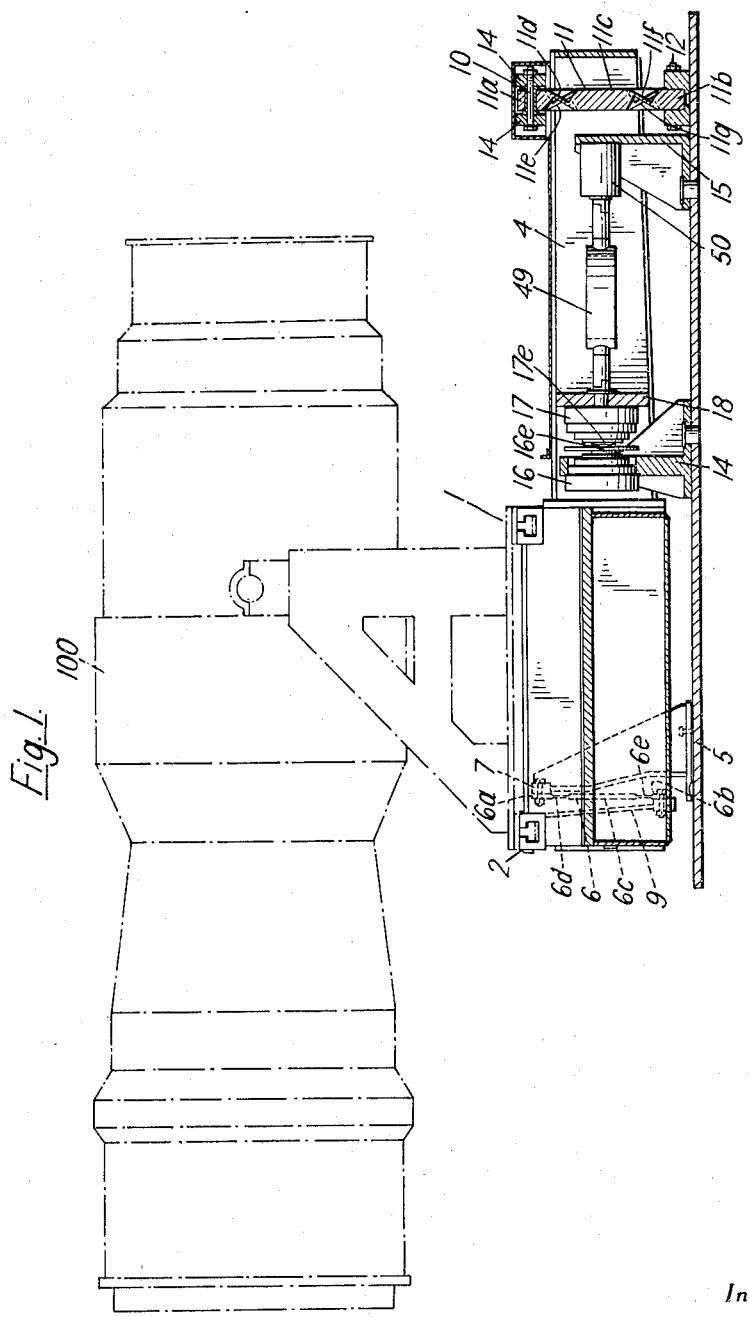

Oct. 12, 1965  E. E. WEEKLEY  3,210,991
ENGINE TEST BENCHES
Filed Nov. 13, 1962  5 Sheets-Sheet 2

Inventor
EDWARD ELIJAH WEEKLEY

By Moore, Hall & Pollock
Attorneys

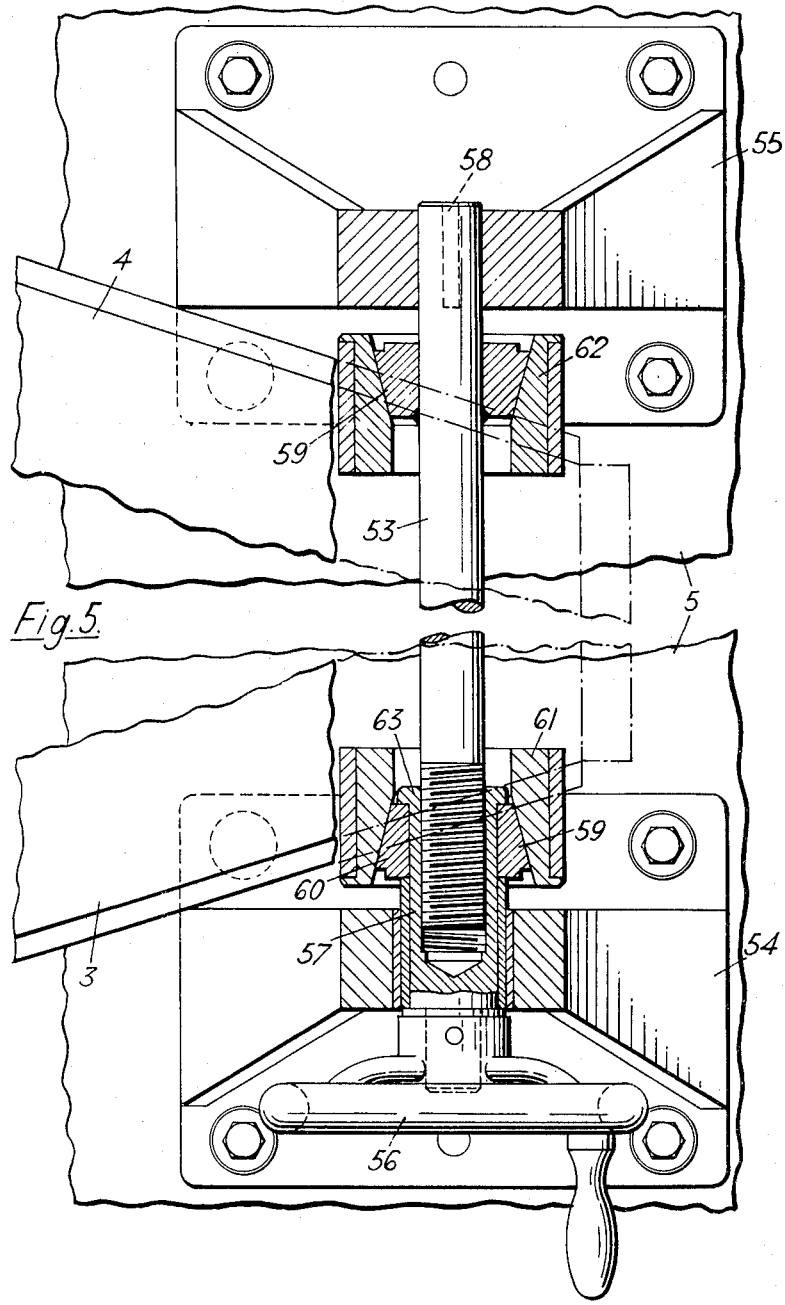

United States Patent Office 3,210,991
Patented Oct. 12, 1965

3,210,991
ENGINE TEST BENCHES
Edward Elijah Weekley, 18 Wesley Ave., Rhoose, Barry, Glamorgan, Wales
Filed Nov. 13, 1962, Ser. No. 236,838
Claims priority, application Great Britain, Nov. 17, 1961, 41,179/61; June 7, 1962, 22,005/62
8 Claims. (Cl. 73—116)

This invention relates to engine test benches.

The invention is applicable to engines of which the performance is measurable by the thrust exerted by the engine and is especially applicable to jet engines.

It is one object of the invention to provide an engine test bench which enables the testing of an engine to be carried out with very small excursions of the engine and its support.

It is a further object of the invention to provide an engine test bench which, while being compact and readily adaptable for use with engines of different construction, enables an engine thrust to be measured with a high degree of accuracy.

According to the invention, an engine test bench comprises an engine carrier, a carrier support embodying force-absorbing means opposing movement of said carrier, a thrust-responsive load cell having two surfaces relatively displaceable by engine thrust, cell-support means connected with one of said two surfaces, force-transmitting means connecting the engine carrier with said cell-support means, a hydraulic capsule having relatively movable walls with one wall in abutting contact with the other of said two surfaces, capsule-support means connected with the other of said walls and force-transmitting means connecting the engine carrier with said capsule-support means for effecting movement of the two cell surfaces together against the action of the action of the engine thrust.

Further according to the invention, an engine test bench comprises an engine carrier, a carrier support, force absorbing means opposing movement of said carrier, a thrust-measuring load cell having two surfaces relatively displaceable by engine thrust, cell-support means rigid with one of said two surfaces and drivably connected with the carrier, and cell-engaging means drivingly engaging the other of said two surfaces and drivably engaging the carrier to transmit carrier movement to the said two surfaces and move the two surfaces together against the action of the engine thrust.

Still further according to the invention an engine test bench comprises an engine carrier having a front and a rear, a pair of short laterally spaced flexible straps each constituting a flexure pivot, means connecting the carrier with the said pivots to place the straps in tension under static engine load, a rearwardly disposed short flexible strap device constituting a crossed-link flexure pivot, means connecting the carrier with the rear pivot to place each strap thereof in compression under static engine load, a thrust-measuring load cell having two surfaces relatively displaceable by engine thrust, cell-support means rigid with one of said two surfaces and drivably connected with the carrier, cell-engaging means drivingly engaging the other of said two surfaces and drivably engaging the carrier to transmit carrier movement in the rearwards direction to the said two surfaces and move the two surfaces bodily together against the action of the engine thrust.

Figure 2:
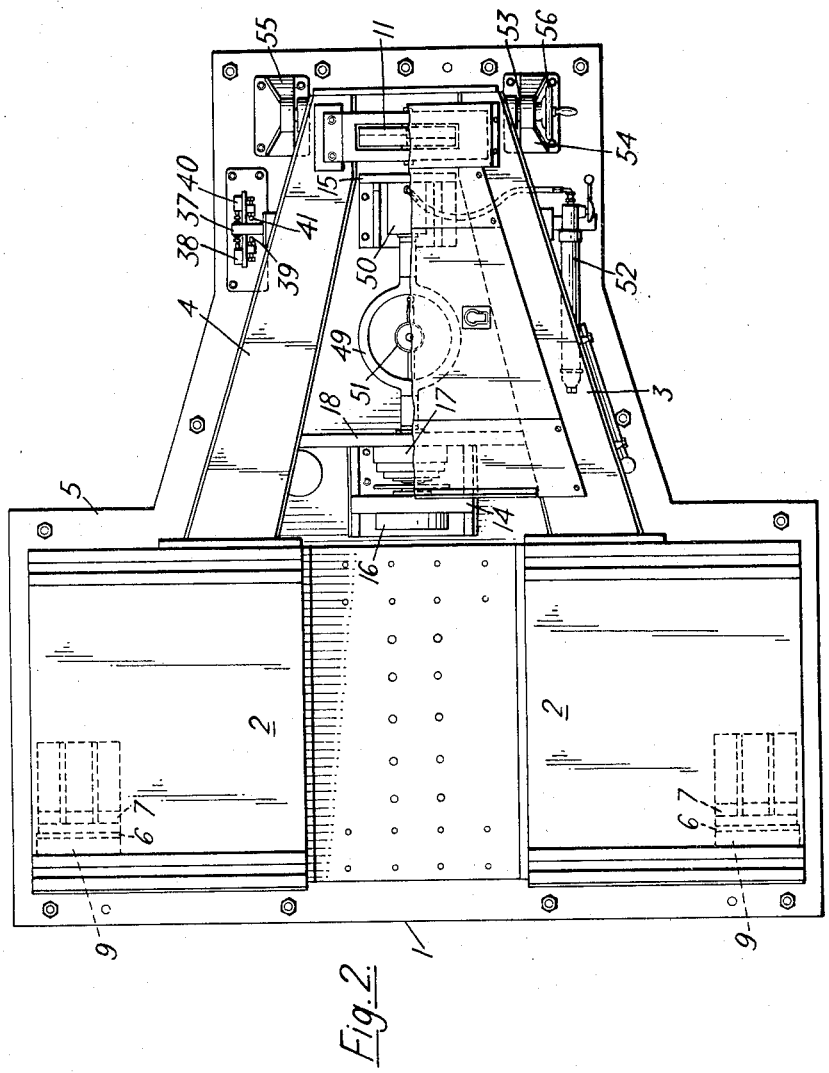
Figure 3:
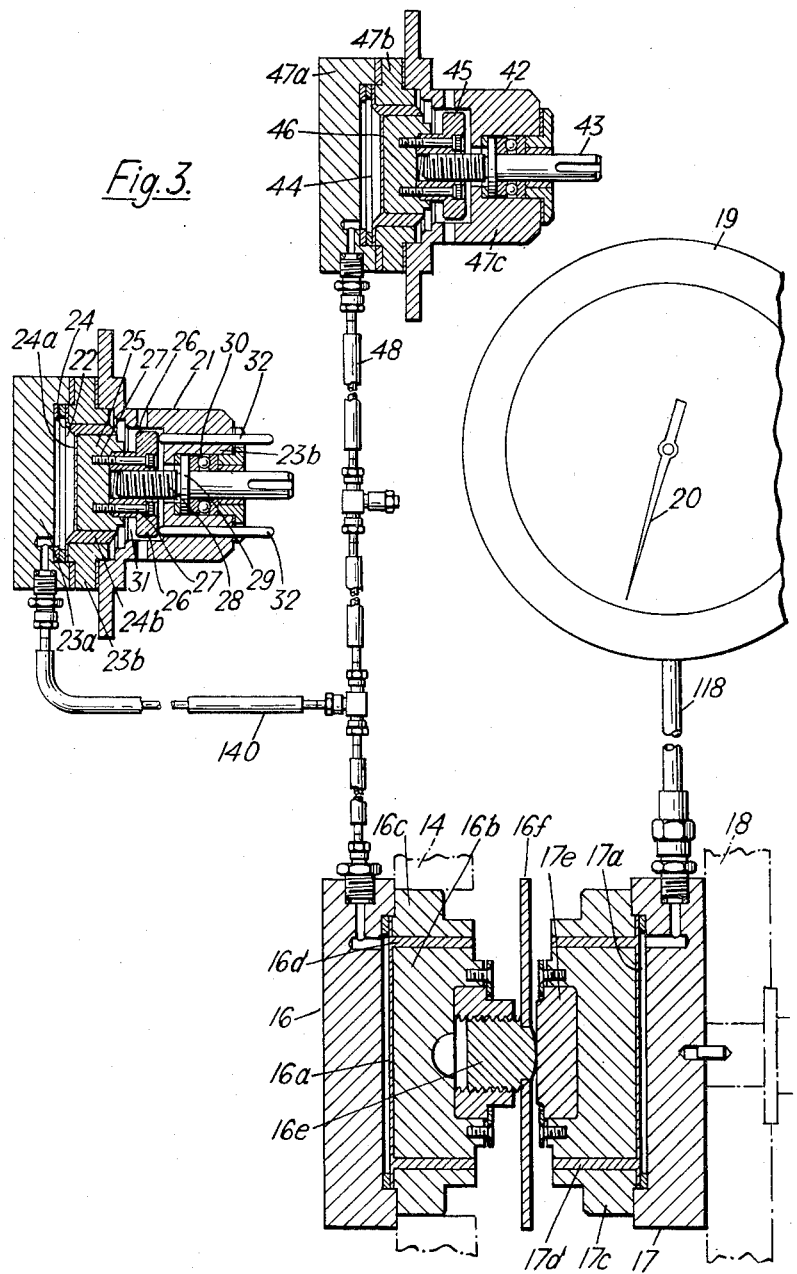
Figure 4:
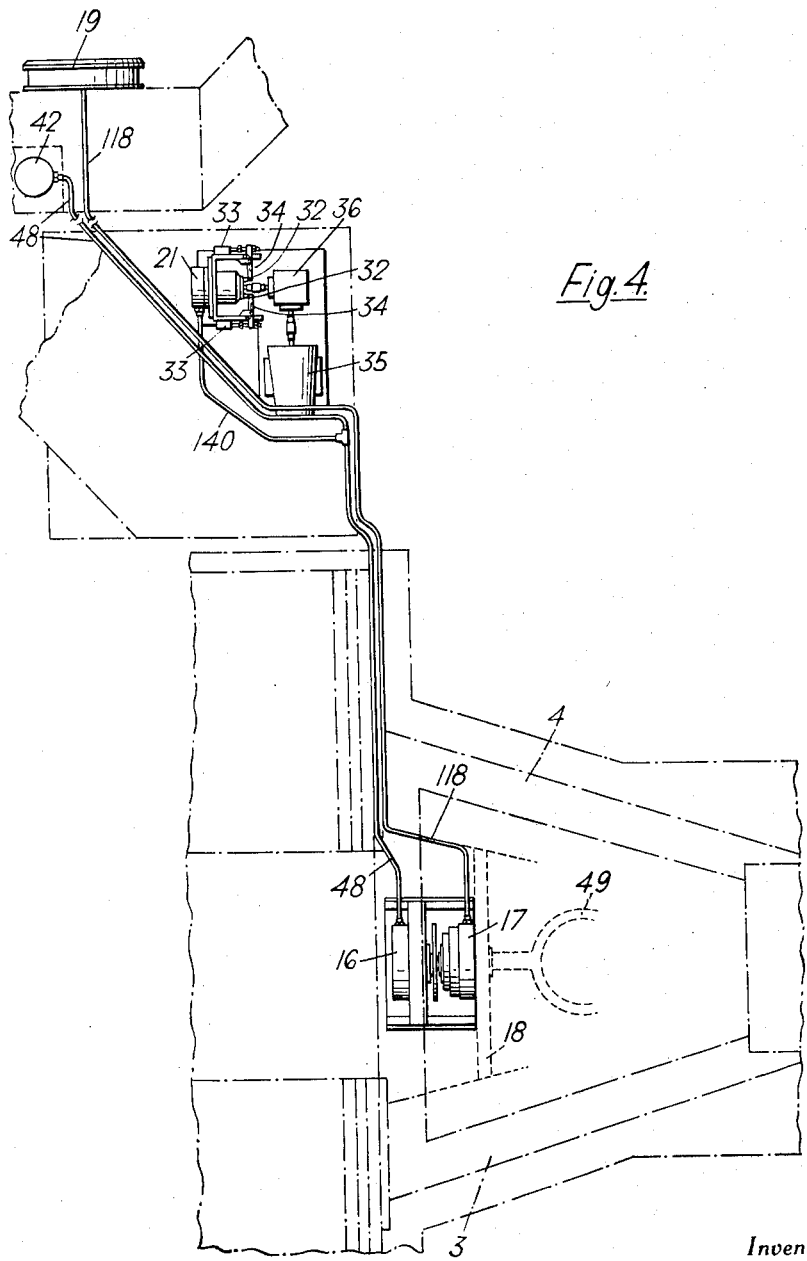

The invention is illustrated by way of example in the accompanying drawings in which FIG. 1 is a sectional front elevation of a test bench for testing jet engines, FIG. 2 is a part sectional plan view of the test bench of FIG. 1, FIG. 3 is a diagrammatic illustration on an enlarged scale of means for adjusting the position of the engine carrier of the test bench shown in FIGS. 1 and 2, FIG. 4 is a fragmentary view showing part of the test bench, and FIG. 5 is a view on an enlarged scale of an engine carrier locking means.

Referring to the accompanying drawings, an engine carrier 1 has a platform 2 and a rigid open structure extending rearwardly from the platform and having two converging arms 3 and 4. The forward end of the platform 2 is supported on a fixed base 5 by a pair of laterally spaced short flexible straps 6 in tension. Each strap 6 has upper and lower end portions 6a and 6b respectively and an intermediate portion 6c which is connected with the upper end portion 6a by a web 6d and with the lower end portion 6b by a web 6e. The webs 6d and 6e are appreciably thinner than the portion 6c so that bending of the strap takes place at the webs. The upper end portion 6a of each strap 6 is bolted to one of two laterally spaced upright pillars 7 rigid with the base 5 while the lower end portion 6b is bolted to the lower end of one of two laterally spaced inclined arms 9 which are each fixed to the platform 2. The rear end of the rearwardly extending platform structure is fixed by bolts 10 to the upper end of a crossed-link flexure pivot 11 which has its lower end secured to the base 5 by bolts 12 and a pedestal 13. The bolts 10 extend through cross-members 114 rigid with the platform structure. The pivot 11 is formed by a strap having an upper end portion 11a, a lower end portion 11b and an intermediate portion 11c. The portion 11c is connected with the upper end portion 11a by webs 11d and 11e which are disposed side by side and edge to edge and are inclined in opposite directions. The portion 11c is connected with the lower end portion 11b by oppositely inclined webs 11f and 11g. The pivot straps 6 and 11 are known per se for the mounting of engine test bench platforms. In the arrangement shown, the webs 11d, 11e, 11f and 11g are integral with the remainder of the strap but two separate straps may be employed and disposed side by side and edge to edge, the adjacent webs in adjacent straps being oppositely inclined. As will be appreciated, the shorter the flexible straps are, the less is the tendency for the platform to respond to side or other incidental loads which may make it more difficult to measure engine thrust exerted in the forward direction. The extent of the fore and aft movement of the platform in response to engine thrust decreases as the length of the straps decreases and it is therefore necessary to make any thrust measuring instrument employed responsive to small movements of the platform when short straps are used.

Disposed between the arms 3 and 4 of the structure which extends rearwardly from the platform 2 are rigid posts 14 and 15 which are fixed to the base 5 and are spaced one behind the other. The forward post 14 carries a hydraulic capsule 16 which has a hydraulic space 16a which is connected in a hydraulic compensating circuit as will be described. The capsule 16 has a movable member 16b (see FIGURE 3) which is movable in a housing 16c to vary the volumetric capacity of the space 16a. A resilient packing material 16d prevents leakage from the space 16a. The movable member 16b receives a head 16e which screws into the member 16b so that the position of the head may be adjusted. A plate 16f is provided in order to facilitate adjustment of the position of the head 16e in the member 16b. A head 17e is arranged to bear, by its outer forward surface, on the head 16e. This head 17e forms part of a hydraulic capsule 17 which comprises a space 17a which is connected by a pipe 118 to a pressure measuring instrument 19 which may be of the type having a pointer 20 movable by a Bourdon tube. The capsule 17 has a resilient packing material 17d to prevent leakage from the space 17a and is of known kind. The capsules 16 and 17 are generally similar. The housing 17c of the capsule 17 is carried by transversely extending rigid beam 18 which is fixed to the arms 3 and 4 and therefore moves with the platform 2. Forward movement of the beam 18 will therefore cause the housing 17c to move forward and cause the positions of the head 17e and the housing 17c to be changed by shortening the distance between the surface of the housing which bears on the beam 18 and the surface of the head 17e which bears on the head 16e of the capsule 16. The volume of the space 17a is thus reduced and a reading is given by the instrument 19. It will be understood that the head 16e of the capsule 16 is not displaceable by the force exerted upon movement of the beam 18 as long as the volume of the space contained by the hydraulic compensating circuit, which is shown in greater detail in FIG. 3 is unchanged.

The hydraulic compensating circuit comprises a device 21 which has a chamber 22 of variable capacity which is defined by a fixed housing part 23a and a diaphragm 24. The diaphragm 24 is bonded over its central part 24a to a rigid block 25. An annular part 24b of the diaphragm surrounding the central part is formed with a wall-like resilient packing 24b and the peripheral portion of the diaphragm is clamped between the housing part 23a and another housing part 23b. The packing 24b is bonded both to the block 25 and to the housing part 23b. The block 25 is connected with a piston 26 by screw threaded studs 27. The piston 26 is engaged by a spindle 28 which has a screw thread which engages in a screw threaded bore in the piston. The spindle 28 is prevented from moving along its axial direction by a collar 29 which is fixed to the spindle and is held by a thrust bearing 30 in a housing part 23b. The piston 26 moves in a chamber 31 in the housing part 23b. Actuating pins 32 are slidably disposed in the housing part 23b and to actuate limit switches 33 (see FIGURE 4) via levers 34. The piston 26 is moved, via a transmission gear 36, by an electric motor 35, which is arranged to rotate the spindle 28, both to reduce and enlarge the volume of the chamber 22. The switches 33 serve to stop the motor when the piston 26 has moved to its fullest permitted extent in either direction, that is to enlarge or decrease the volume of the chamber. The lever arms 34 are spring-biassed to follow the movement of the actuating pins 32 and also to cause the pins to move inwards as the piston 26 moves to decrease the volume of the chamber 22. In order to start the motor 35, a pin 37 (see FIGURE 2) which projects laterally from the arm 3 is arranged, when the platform 2 is moved forward by the engine thrust to engage and actuate an electric microswitch 38 to cause the piston 26 to move to reduce the volume of the chamber 22. A stop 39 serves to limit movement of the platform 2 in the forward direction. When the volume of the chamber 22 is reduced, the liquid in the chamber is forced through a pipe 140 to the space 16a of the capsule 16. This flow of liquid causes the head 16e to push the head 17e of the capsule 17 towards the housing 17c but as the housing 17c is connected to the beam 18, the relative position of the head 17e and the housing 17c is unchanged and the platform moves to its original position from which it was moved forward by the engine thrust. During this return movement of the platform 2, the indication given by the instrument 19 remains unchanged and still indicates the value of the engine thrust. When the platform 2 has been returned to its original position, the pin 37 leaves the switch 38 which is biassed to return to its position in which it stops the motor 35, When the engine test is completed and the engine is stopped, the straps of the pivots 6 and 11 bias the platform 2 to move rearward until pin 37 engages and operates a second microswitch 40 to cause the motor 35 to start up in its reversed direction and thus cause the piston 26 to return to its original desired position of rest. A stop 41 serves to limit rearward movement of the pin 37 and, accordingly, of the platform. The motor 35 stops rotating in its reversed direction when the pin leaves the switch 40 and this switch automatically returns to its non-operated position. This occurs when the straps of the pins 6 and 11 occupy their normal position, that is the position when no engine thrust is applied to move the platform 2.

In addition to the motor-actuated device 21, there is also provided a manually operable device 42 which is arranged in parallel with the device 21. This device 42 has a spindle 43 which is adapted to be turned by a handle, not shown. The device 42 is otherwise similar to the device 21, having a chamber 44, piston 45, diaphragm 46, and housing parts 47a, 47b and 47c. A pipe 48 places the chamber 44 in communication with the space 16a of the capsule 16. The device 42 is provided for use in calibrating and setting-up the test bench.

It will be understood that the straps of the pivots 6 and 11 resist movements of the platform 2 under the influence of an engine thrust and that the shorter the straps the less will be such movements. The force exerted by the compensating device acts in a direction to bias the straps to their undeflected position, that is their position which they occupy when an engine thrust is absent. The nearer the position of the platform and the pivot straps to their rest position when an engine is being tested, the less will be the effect of structural deflections of the bench and the more accurately will the thrust along the axis of the engine be measured.

It will also be noted that the method of supporting the engine platform by forwardly placed straps in tension and by a rear support which will permit both tension and compression loads to be accepted, provides for the fact that, when an engine runs, it imposes a force on the rear support which tends to tilt the rear end of the platform structure upwards. The rearwards acting component of the consequent force on the rear support is opposed by a forward component of the engine thrust and this fact also conduces to accuracy of measurement of the engine thrust.

The arrangement shown can be made with the top of the platform at a low level and as access to the platform is unobstructed, an engine for test can easily be mounted on the platform. An engine for test may, as will readily be understood, be suspended by flexible straps instead of being supported by straps located below the engine as described above. Hoisting means may be provided for lifting an engine to be tested towards the cantilever arm to which the engine is then secured.

Calibration of the measuring instrument 19 is effected easily and quickly in the construction shown in the drawings by means of a proving ring 49 (see FIGURE 2) of the compression type which is supported at one end by the housing 17c of the hydraulic capsule 17 and at the other end by a ram 50 which is carried by the post 15. A measuring instrument 51 of known kind is supported by the proving ring 49 and extends across a diameter of the ring. A manually operable jack 52 is arranged to supply hydraulic liquid to the ram 50. The instrument 51 serves as a standard when calibration is being effected.

A device for locking the platform 2 against movement, during transport and while an engine is being placed in position for a test run, is illustrated in FIG. 2 and, on a large scale, in FIG. 5. This device comprises a spindle 53 which is carried at opposite ends by pedestals 54 and 55 which are fixed to the base 5. This spindle 53 is axially movable by a handwheel 56 which is fixed to a sleeve 57 which is in screw threaded engagement with one end of the spindle 53. The other end of the spindle is axially movable in a bearing in the pedestal 53 and is prevented from rotating by a key 58. Rotation of the sleeve 57 in one direction causes the spindle 53 to move a wedge 59 out of locking contact with a wedge bearing 62 carried by the arm 4. At the same time the sleeve 57, by means of an annular projection 63 engages another wedge 60 to move this wedge out of locking contact with a wedge bearing 62 carried by the arm 3. The movement of the wedges 59 and 60 out of locking contact with the bearing surfaces takes place in opposite directions and is sufficient to enable the arms 3 and 4 to move longitudinally through the short distances required to carry out a thrust measuring operation.

An engine 100 under test is shown diagrammatically in broken lines in FIG. 1 and indicated by the reference 100.

Instead of employing a hydraulic hydrostatic capsule such as the capsule 17 as a load cell in the instrument circuit, other load cells may be used including hydrodynamic capsules and electrical and mechanical cells. One example of a hydrodynamic cell is one which includes one wall arranged to be moved to vary locally the cross-sectional area of the path for the hydraulic fluid flowing in the circuit. An example of an electrical load cell is a load cell used with electrical strain gauges.

I claim:

1. An engine test bench comprising an engine carrier, a carrier support embodying force absorbing means opposing movement of said carrier, a thrust-measuring load cell having two surfaces relatively displaceable by engine thrust, cell-support means connected with one of said two surfaces, force-transmitting means connecting the engine carrier with said cell-support means, a hydraulic circuit, a hydraulic capsule in said circuit having relatively movable walls with one wall in abutting contact with the other of said two surfaces, a cylinder in said circuit, a piston movable in said cylinder, a motor drivingly connected with the piston, motor starting means responsive to movement of the engine carrier, capsule-support means connected with the other of said walls and rigid with said carrier support, said hydraulic circuit including the capsule constituting force-transmitting means effecting movement of both cell surfaces concurrently in opposition to the action of the engine thrust.

2. An engine test bench as claimed in claim 1 comprising motor driving means for moving the piston in opposite directions.

3. An engine test bench comprising an engine carrier having a front and a rear, a pair of short laterally spaced flexible straps each constituting a flexure pivot, means connecting the forward end of the carrier with the said pivots to place the straps in tension under static engine load, a crossed-link flexure pivot supporting the rear portion of said carrier in compression under static load, said crossed-link flexure pivot comprising three spaced rigid members the lower of which is operatively connected to a fixed support and the upper of which is operatively connected to said carrier, said rigid members being connected together by at least two flexible webs which are oppositely inclined to the vertical and are in side-by-side relationship, a thrust-measuring load cell having two surfaces relatively displaceable by engine thrust, cell-support means rigid with one of said two surfaces and drivably connected with the carrier, cell-engaging means drivingly engaging the other of said two surfaces and drivably engaging the carrier support to transmit carrier movement in the rearwards direction to the said two surfaces and move the two surfaces concurrently in opposition to the action of the engine thrust.

4. An engine test bench comprising, a carrier support, an engine carrier mounted upon said support, and force-absorbing mounting means for supporting said carrier support to permit limited movement of said carrier support and engine carrier during thrust testing of an engine mounted on said engine carrier, load cell means connected to said carrier support and responsive to the force produced by the test engine, said force-absorbing mounting means comprising a first supporting element in tension and operatively connecting one end of said carrier support to a fixed support, said force-absorbing means comprising a second supporting element in compression under static conditions and operatively connecting the other end of said carrier support to a fixed support, said second supporting element comprising three vertically aligned spaced substantially rigid members interconnected to one another in the region of their spacing by at least two oppositely inclined flexible straps, one of said rigid members being operatively connected to said carrier support and the other of said rigid members being operatively connected to said fixed support, said straps being located in side-by-side relation to one another.

5. The engine test bench of claim 4 in which said spaced rigid members are of substantially rectangular cross section and each said flexible strap extends from an edge of one of the two mutually opposing ends of said spaced rigid members to the diagonally opposite edge of the opposing end of the other of said rigid members.

6. The engine test bench of claim 4 in which said flexible straps are oppositely inclined relative to a vertical plane which is generally perpendicular to the direction of movement of the engine carrier in response to engine thrust.

7. The engine test bench of claim 4 in which said inclined straps are integral with each other at their junction and are each integral with both said rigid members.

8. The engine test bench of claim 4 in which said first supporting element is connected adjacent the front end of said carrier and said second supporting element is connected adjacent the rear end of said carrier.

References Cited by the Examiner

UNITED STATES PATENTS

| 2,593,906 | 4/52  | Markson         | 73—141 X |
| --------- | ----- | --------------- | -------- |
| 2,657,574 | 11/53 | Whitehead       | 73—116   |
| 2,685,794 | 8/54  | Hall et al.     | 73—141 X |
| 2,904,009 | 9/59  | Salter          | 254—93 X |
| 2,941,398 | 6/60  | Pugnaire et al. | 73—116   |
| 3,015,951 | 1/62  | Ochs            | 73—141   |
| 3,038,331 | 6/62  | Henry et al.    | 73—116   |
| 3,060,732 | 10/62 | Corry           | 73—141   |
| 3,122,917 | 3/64  | Ormond          | 73—116   |

RICHARD C. QUEISSER, *Primary Examiner.*

DAVID SCHONBERG, *Examiner.*